United States Patent [19]

Jewett et al.

[11] 4,312,317
[45] Jan. 26, 1982

[54] CARBURETOR

[75] Inventors: Bryce D. Jewett; Robert H. Raynor; Robert P. Adams, all of Richmond, Va.

[73] Assignee: Bryce D. Jewett Machine Manufacturing Company, Inc., Richmond, Va.

[21] Appl. No.: 86,576

[22] Filed: Oct. 19, 1979

[51] Int. Cl.³ .................... F02M 31/00; F02M 13/04
[52] U.S. Cl. .................................. 123/522; 123/557; 261/125; 261/22
[58] Field of Search ............... 123/557, 552, 522, 523; 261/121 R, 125, 22; 55/223

[56] References Cited

U.S. PATENT DOCUMENTS

| | | | |
|---|---|---|---|
| 484,721 | 10/1892 | Parris | 261/22 |
| 1,276,937 | 8/1918 | McKenney | 261/22 |
| 1,530,882 | 3/1925 | Chapin | 123/522 |
| 1,629,898 | 5/1927 | Williams | 123/522 |
| 3,615,074 | 10/1971 | Cook | 261/22 |
| 3,713,429 | 1/1973 | Dwyre | 123/552 |
| 3,792,688 | 2/1974 | Grainger | 123/549 |
| 3,800,533 | 4/1974 | Zankowski | 123/522 |

FOREIGN PATENT DOCUMENTS 23103 12/1900 Switzerland .................... 261/121 R Primary Examiner—Ronald H. Lazarus
Attorney, Agent, or Firm—Harvey B. Jacobson

[57] ABSTRACT

A device is disclosed which, when used in conjunction with a conventional carburetor metering device of an internal combustion engine, allows formation of a mixture of fuel vapor and air which burns more efficiently and yields less harmful combustion by-products than conventional carburetor systems. Incoming air to the engine is substantially completely saturated with fuel vapors by passing the air through a controlled volume of liquid fuel heated to a predetermined temperature, thereby allowing the air stream to become substantially saturated with fuel vapors. The air-fuel vapor mixture is further leaned downstream by the addition of fresh air, and the leaner, but more uniformly and controllably saturated air-fuel mixture then is introduced into the engine.

12 Claims, 2 Drawing Figures

CARBURETOR

BACKGROUND OF THE INVENTION

1. Field of the Invention

The invention relates to a carburetor device or system for use in association with a liquid fuel internal combustion engine, where incoming air to the engine is mixed with vapors of a volatile hydrocarbon fuel, such as gasoline, for combustion within the engine.

2. Disclosure Statement

In U.S. Pat. No. 3,713,429, issued to J. R. Dwyre, Jan. 30, 1973, heating of gasoline fuel in a a carburetor is disclosed, where heat exchange from hot fluid generated by the engine facilitates formation of a gas-air vapor mixture. Injection of air into the gasoline in the carburetor occurs through a multiple-hole nozzle immersed in the liquid fuel. Gradual activation of the Dwyre system is provided for, which can lead to problems of very poor engine performance during the switch over period. W. H. Schoonmaker in U.S. Pat. No. 1,121,137, issued Dec. 15, 1914, shows a perforated air inlet tube for use in a carburetor of an internal combustion engine, and R. T. Williams in U.S. Pat. No. 1,195,315, patented Aug. 22, 1916, as well C. Robinson in U.S. Pat. No. 706,454, patented Aug. 5, 1902, shows a float valve in combination with saturation chambers, although not in the context of an internal combustion engine. F. W. Rachholz in U.S. Pat. No. 301,009, patented June 24, 1884, discloses a device for forcing air into a reservoir to enable the air to absorb volatile fuel components and be stored in a gas-holder. In addition, the Rachholz patent teaches supplying heat to the volatilization tank by applying an open flame beneath the tank.

Another U.S. Patent relating generally to the field of the disclosure is the following:

U.S. Pat. No. 474,838    J. W. Lambert    May 17, 1892

None of the aforementioned patents, however, discloses the combination of an automotive carburetor having a saturation chamber wherein the fuel mixture is warmed by waste engine heat, together with a storage chamber and a float valve for liquid fuel level control. A need exists, however, for more efficient control and production of a fuel-air gaseous mixture, as well as for compensating for the latent heat of vaporization of liquid fuel changing state from the liquid to gaseous phase which causes the fuel mixture to decrease in temperature.

SUMMARY OF THE INVENTION

The invention provides an approach to overcoming problems with prior art carburetor systems which can lead to poor engine performance, erratic float action, problems resulting from the falling temperature resulting from vaporization of liquid fuel, and less efficient combustion yielding a higher proportion of harmful by-products of combustion.

The present invention overcomes certain problems in prior art carburetor systems by providing an automotive carburetor in which a liquid fuel mixture is warmed by waste engine heat by heat exchange in a saturation chamber partially filled with liquid fuel, air entering through an inverted funnel dipping into the liquid fuel, where the inverted funnel is covered with screen mesh. Further, a storage chamber holds saturated vapor in contact with fuel mixture, the level of liquid fuel in both the saturation and storage chambers being controllable by a float valve.

Accordingly, it is an object of the present invention to provide a carburetor device which consists of a dual chamber system for saturating fuel vapor at a consistent and uniform temperature.

Another object is to provide a carburetor device which compensates for the latent heat of vaporization of liquid fuel by applying heat to the liquid at a constant rate.

Still another object is to provide a more fully saturated air-fuel mixture due to the more uniform fuel mixture temperature resulting from the dual chamber arrangement.

Yet another object is to provide an air-fuel mixture which burns more efficiently.

A further object is to provide an air-fuel mixture which yields fewer harmful by-products of combustion and thereby reduces discharge of pollutants to the atmosphere.

Another further object is to provide heating for the liquid fuel through the use of waste heat, such as cooling system water heat.

A still further object is to provide for addition of fresh air to the air-fuel mixture according to engine demand, so as to provide for the leanest possible air-fuel vapor ratio.

Yet a further object is to provide operating controls for controlling the liquid fuel temperature, the leaning of air-fuel mixture, and the intake air temperature.

These, together with other objects and advantages which will become subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

With the present invention, 7a carburetor system is shown with which it is possible to provide for smooth float valve action, inasmuch as air is forced into liquid fuel in a chamber separate from that in which the float valve is placed. Further, air is introduced externally, thereby reducing the need for baffling otherwise necessary to minimize problems of turbulence in the chamber.

Figure 1:
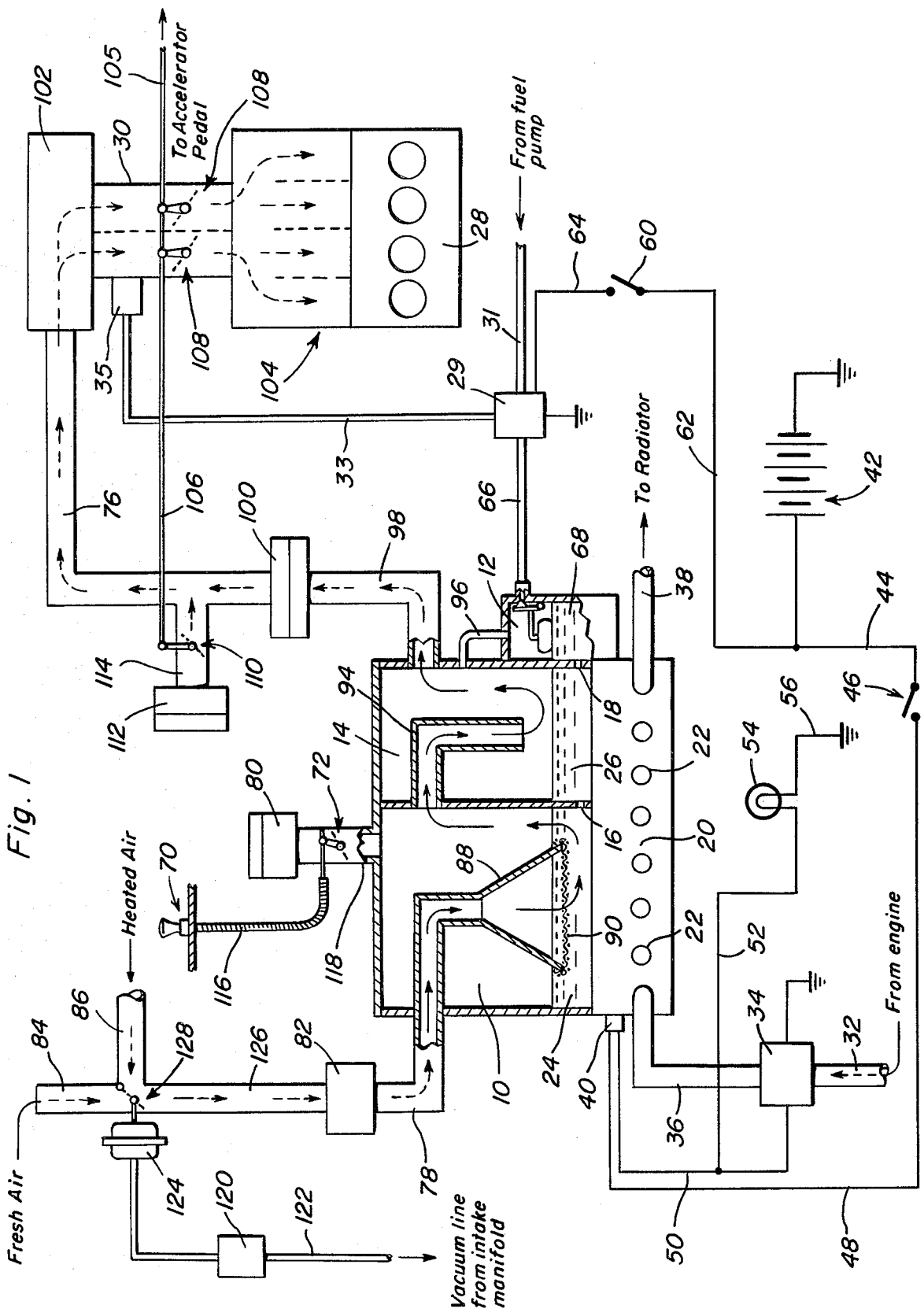
FIG. 1 is a schematic view of a preferred embodiment of the system including temperature controls for regulating the heating of fuels.

Accordingly, as seen in FIG. 1, vaporization of liquid fuel occurs primarily in saturation chamber 10, and introduction of fuel is made in conventional float bowl 12 while fuel vapors are stored in contact with liquid fuel in storage chamber 14. Orifice 16 links saturation chamber 10 and storage chamber 14, allowing free flow of liquid fuel therebetween, since orifice 16 is located below the minimum level to which liquid fuel would fill chambers 10 and 14. Similarly, orifice 18 links secondary float bowl 12 and storage chamber 14, thus permitting passage of liquid fuel therebetween. Water jacket 20 is heated by hot engine coolant flowing through tubes 22 in the water jacket, and heat is transferred by direct thermal contact from water jacket 20 to liquid fuel 24 in saturation chamber 10 and liquid fuel 26 in storage chamber 14. External air is introduced into liquid fuel 24 in saturation chamber 10, as indicated by the arrows. The further flow of fuel-containing vapors is shown by arrows going from saturation chamber 10, ultimately leading to internal combustion engine 28.

In operation, as engine 28 is started from a cold start, fuel from the fuel pump enters fuel lines solenoid valve 29 from fuel line 31 and is directed by solenoid valve 29 into bypass line 33, which is connected to primary float bowl 35 of metering device 30. Primary float bowl 35 and metering device 30 together constitute a conventional carburetor assembly, which operates in a known manner. However, as the temperature of engine 28 increases, water from the engine cooling system is routed through inlet pipe 32 and through a normally open coolant solenoid valve 34, thence through pipe 36 and into the base of water jacket 20 through tubes 22. Water leaves jacket 20 through outlet pipe 38 and returns to the radiator. As the temperature in jacket 20 rises to a predetermined setting, thermostat 40, which is mounted in mechanical and thermal contact with jacket 20, responds to the temperature increase so as to complete an electrical circuit from battery 42 through wire 44, across ignition switch 46, and through wire 48, which is connected to thermostat 40. Accordingly, when the predetermined temperature setting is exceeded, wire 50 connecting thermostat 40 and coolant solenoid valve 34 causes valve 34 to close, shutting off the water flow to jacket 20. At the same time, an electrical circuit is also completed through wire 52 across indicator light 54 through wire 56 to ground, causing light 54 to be activated. As the temperature in water jacket 20 drops below the predetermined setting, solenoid valve 34 opens in response to an opening of the electrical circuit at thermostat 40, thereby allowing water flow through pipe 36. The action of opening and closing the coolant solenoid valve 34 maintains a substantially constant temperature in water jacket 20 at or near the predetermined temperature limit. Indicator light 54 is positioned for observation by the vehicle operator, and serves to signal the vehicle operator that water jacket 20 is at the proper operating temperature for use and the system can be manually switched into operation.

When the vehicle operator places the system of the present invention into operation, switch 60 is closed manually to complete an electrical circuit from battery 42 through wire 64 to fuel line solenoid valve 29. This action shuts off the flow of gasoline from fuel line 31 into line 33, and instead diverts the flow of liquid fuel into line 66. Line 66 is connected to secondary float bowl 12, which has been previously filled with liquid fuel 68. As the gasoline level in primary float bowl 35 is exhausted, manual lever 70 is closed to close butterfly valve 72, which has served to admit air to air line 76 during operation of metering device 30 and float bowl 35. However, when butterfly valve 72 is closed, air is forced to enter saturation chamber 10 through air lines 78, in which filter 82 is placed, causing air to be drawn in by engine 28 from tube 84 or tube 86. Tube 86 permits introduction of heated air from the exhaust manifold shroud (not shown). Filtered air entering through line 78 passes into inverted funnel 88, which is covered at its lower mouth by screen mesh 90 securely attached to inverted funnel 88. Air then bubbles through liquid fuel 24 in saturation chamber 10, the bubbles emerging as indicated by the arrows substantially saturated with fuel fumes. The hot water supplied to jacket 20 compensates for the latent heat of vaporization needed to evaporate liquid fuel 24, with thermostat 40 serving to maintain the proper degree of heating from engine coolant.

The air-fuel mixture is then drawn into storage chamber 14 through tube 94. In storage chamber 14, a liquid level of fuel 26 is maintained which matches the level of liquid fuel 24 in saturation chamber 10. Storage chamber 14 collects any condensation, or extraneous or entrained liquid in the air-fuel mixture. The liquid level of fuel 26 in storage chamber 14 also matches the liquid level of fuel 68 in float bowl 12 with orifices 16 and 18 metering the flow of liquid fuel between the three chambers. To compensate for any pressure difference between storage chamber 14 and the top of float bowl 12, passageway 96 is connected between the two chambers. The mixture of air substantially saturated with fuel vapor at the temperature determined by thermostat 40 is then drawn from storage chamber 14 through tube 98, through one-way check valve 100, through tube 76 into adapter 102, through metering device 30, and through intake manifold 104 into engine 28. As the main throttle valve is opened, in response to pressure on the accelerator pedal (not shown), mechanical linkage 105 operates, opening butterfly valves 108 to increase or decrease the volume flow of air-fuel mixture into engine 28 while correspondingly increasing or decreasing the power generated by the engine. As the main throttle valve is opened, mechanical linkage 106 also opens auxiliary butterfly valve 110, allowing fresh air to flow through filter 112, through tube 114 and into tube 76, mixing with the previously saturated mixture from line 98. This leans out the mixture to a predetermined ratio as determined by the exact mechanical relationship represented by auxiliary butterfly valve 110. As is well known in the art, leaning out a mixture of air and fuel vapor means increasing the relative ratio of air and fuel vapor. To further lean out the mixture for maximum fuel economy, lever 70 controlling cable 116 attached to butterfly valve 72 can be manually adjusted so that more air will flow through filter 80 through tube 118. This setting can vary from day to day due to specific weather conditions. As the air temperature under the hood increases to a predetermined air temperature value, temperature sensor 120 opens vacuum line 122, thereby causing vacuum valve 124 to mechanically actuate and shift the airflow from tube 86, connected to the exhaust manifold shroud, over to tube 84, which allows fresh air to enter line 126. This switching is accomplished by means of valve 128.

It is to be noted that waste energy from the engine cooling system supplies the energy to evaporate liquid fuel in saturation chamber 10, and that thermostatic control of the temperature of liquid in the saturation chamber permits a controlled and substantially uniform temperature of liquid and saturated vapor in the saturation chamber. Inasmuch as the vapor pressure of liquid fuels, such as gasoline, shows a sharp degree of dependency on temperature, the uniformity of temperature in the vaporization process has a substantial bearing on the ratio of fuel to air produced. For example, the vapor pressure of isooctane ranges from 10 mm to 40 mm over the temperature range of 12.3° C. (54° F.) to 37.9° C. (100° F.). A similar sharp degree of dependency of vapor pressure on temperature can be observed for other common components of liquid hydrocarbons marketed as gasoline. Accordingly, uniformity of temperature during the vaporization process contributes substantially to control of the richness or leanness of fuel mixture produced, and thereby leads to greater efficiency of operation of the engine supplied with fuel.

Introduction of additional fresh air through line 114 enables a reduced vacuum to be applied to saturation chamber 10 from line 98 under those conditions when heavy acceleration requires a leaner mixture. Accordingly, no baffle plate or liquid retainer in saturation chamber 10 or storage chamber 14 is needed, as is occasionally required by certain prior art configurations. Check valve 100 is provided as a safety measure to prevent reverse flow from entering the system in case of engine backfire.

Figure 2:
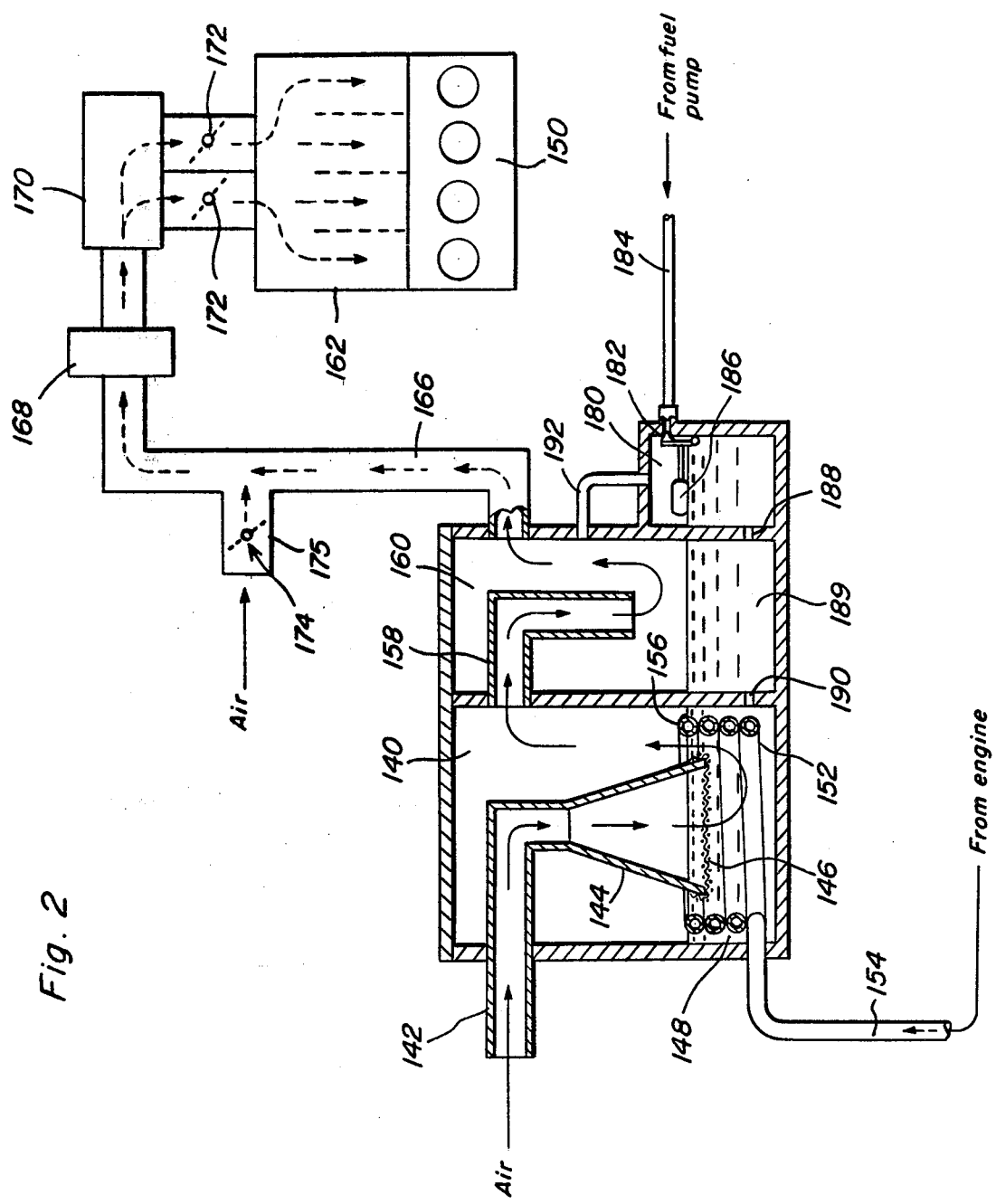
FIG. 2 is a schematic view of a second embodiment of the invention, showing a modified form of heating of fuel in the carburetor chamber.

In the second embodiment of the invention shown in FIG. 2, a dual chamber system is provided in which air is drawn into saturation chamber 140 through intake tube 142 and inverted funnel 144, on which screen mesh 146 is attached to break up the airflow as it passes through liquid fuel mixture 148 in saturation chamber 140. The flow of air is developed by the displacement of the engine components of the internal combustion engine 150 to which the device is attached. As the air passes through liquid 148 in saturation chamber 140, it becomes saturated to the point that the air-fuel mixture will ignite in the combustion chamber of engine 150. To compensate for the latent heat of vaporization needed to evaporate liquid 148, a set of water heated coils 152 is arranged in liquid 148 in saturation chamber 140. Heated water in coils 152 is obtained from hot engine coolant passing through line 154, and emerges from coil 156 to be passed to the radiator (not shown). Since the heat required for warming liquid fuel 148 is obtained from waste heat, engine efficiency is not diminished. From saturation chamber 140, the air-fuel mixture, which is substantially saturated with fuel vapors, is drawn through tube 158 into storage chamber 160. In storage chamber 160, the vapors are stored and drawn as required into intake manifold 162 of engine 150. Vapors entering storage chamber 160 from pipe 158 are drawn into pipe 166 through one-way valve 168, which functions as an anti-backfire valve as a safety feature, and the vapors then pass into adapter 170, past throttle valves 172 and into intake manifold 162 for delivery into the engine cylinders. Auxiliary butterfly valve 174 in tube 175 is installed to enable outside air to be introduced. Valve 174 is attached through a mechanical linkage (not shown) to the main throttle valve and as the engine is accelerated, the valve opens, further leaning the air-fuel mixture. Attached to the exterior of storage chamber 160 is fuel float bowl 180 having needle valve 182 for metering the flow of liquid fuel from the fuel pump through fuel line 184 to storage chamber 160. The float 186 controls the flow from fuel line 184 so as to maintain a predetermined liquid level in float chamber 180. Orifice 188 connecting float bowl 180 with storage chamber 160 permits flow of liquid fuel therebetween, and orifice 190 between storage 160 and saturation chamber 140 also permits flow of liquid whereby the level of liquid fuel in each of the three chambers is controllable at approximately the same level. To compensate for any pressure difference between the vapors in float bowl 180 and storage chamber 160, passageway 192 is connected therebetween. Vapors are stored in storage chamber 160, and the liquid level in storage chamber 160 is maintained to collect any condensation, extraneous liquid, or entrained liquid in the air-fuel mixture. Liquid fuel 189 in storage chamber 160 eventually passes back into saturation chamber 140 through orifice 190.

With use of the embodiment of FIG. 2, heat is transferred directly into the liquid fuel by heat exchange coils 152, thereby providing heat to the liquid which would otherwise be absorbed as latent heat of vaporization when liquid fuel 148 is converted from the liquid to the gaseous phase in saturation chamber 140. Further, butterfly valve 174 permits the addition of fresh air as demanded by engine 150, in order to provide for the leanest possible air-fuel ratio. With use of the invention of FIG. 2, saturation of air by fuel vapors is more completely accomplished with the addition of heat from a conventional coolant system.

The invention disclosed above offers the following advantages over certain prior systems, such as that of Dwyre, disclosed in U.S. Pat. No. 3,713,429. Dwyre provides for gradual activation of his system as the engine warms up, gradually operating a solenoid valve as a thermostat element comes into operation. Such a system is likely to be plagued with problems of reliability, and engine performance must necessarily be very poor during the period of switchover. Further, no means is provided by Dwyre for additional downstream air intake other than a relief valve which opens when excessive vacuum is generated in the saturation chamber. By providing a dual chamber arrangement for the present invention, turbulence which could interfere with the operation of the float valve is avoided, and the storage of substantially saturated vapors is made possible. Further, the multiple chamber arrangement obviates the need for a baffle to reduce the effect of suction and turbulence, as described hereinabove. While the Williams patent (No. 1,195,315) discloses a float valve in combination with a saturation chamber, no source of heat is provided to aid in evaporation, and erratic float action would be expected when connected to an internal combustion engine. Further, only manual air bypass adjustment is possible with the Williams device. Lambert in U.S. Pat. No. 474,838, Schoonmaker in U.S. Pat. No. 1,121,137, and Rachholz in U.S. Pat. No. 301,009, all show relatively crude systems, none of which makes use of waste heat from engine coolant for heating liquid fuel undergoing vaporization.

With use of the dual chamber system of the present invention, certain of the drawbacks associated with prior devices are overcome, improved performance of the engine is achieved, and reduction of harmful combustion by-products is achievable, as well as improved fuel economy. These factors, which have in recent years come to assume greater importance than previously, impart to the invention a utility which might in earlier years been overlooked.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A carburetor system for a liquid fuel internal combustion engine cooled by a circulating liquid coolant, said system comprising:

saturation chamber means having a supply of said liquid fuel contained therein;

air intake means fluidly connected to said saturation chamber means and being operable to direct a supply of air through said liquid fuel contained in said saturation chamber means so as to create a fuel and air vapor mixture for delivery to said internal combustion engine for combustion purposes;

heat exchange means operably connected to said saturation chamber means and serving to heat said liquid fuel contained in said saturation chamber means so as to compensate for heat loss during a vaporization of said liquid fuel contained in said saturation chamber means; and storage chamber means for receiving and storing said fuel and air vapor mixture prior to a delivery of said vapor mixture through a vapor conveying means to said internal combustion engine for combustion purposes, said storage chamber means having a supply of said liquid fuel contained therein, said liquid in said storage chamber means being in fluid communication with said liquid fuel contained in said saturation chamber means by means of an orifice means connecting said saturation chamber means and said storage chamber means, said orifice means being positioned below a mimimum level of said liquid fuel contained in said saturation chamber means and said storage chamber means, whereby a substantially constant level of said liquid fuel is maintained between said saturation chamber means and said storage chamber means, said delivery of said vapor mixture to said storage chamber means from said saturation chamber means being effected by a conduit means fluidly connecting said saturation chamber means and said storage chamber means, said conduit means being located above a maximum level of said liquid fuel contained in said saturation chamber means and said storage chamber means.

2. The carburetor system of claim 1 wherein said storage chamber means is fluidly connected to a secondary float bowl for introduction of liquid fuel into said storage chamber means and saturation chamber means, said secondary float bowl having a float valve for maintaining a constant level of said liquid fuel in a float chamber forming a part of said float bowl, and in said storage chamber means and said saturation chamber means, said liquid fuel being delivered through said float valve into said secondary float bowl from a fuel line, said secondary float bowl being fluidly connected to said storage chamber means below said minimum level of said liquid fuel in said secondary float bowl and said storage chamber means by a second orifice means permitting free passage of said liquid fuel therebetween, said secondary float bowl being fluidly connected above a maximum level of said liquid fuel contained therein to said storage chamber means for equalization of pressure of said vapor mixture therebetween.

3. The carburetor system of claim 2 wherein said heat exchange means comprises a water jacket means in thermal and mechanical contact with said saturation chamber means and said storage chamber means, said water jacket means having a plurality of tubes for conducting heated liquid coolant from said internal combustion engine therethrough, whereby waste heat from said coolant is transferred to said liquid fuel in said saturation chamber means and said storage chamber means.

4. The carburetor system of claim 3 wherein a thermostat in mechanical and thermal contact with said water jacket means permits an electrical circuit to be completed with a coolant solenoid valve whenever a predetermined temperature of said water jacket means is exceeded, said coolant solenoid valve being closed when said electrical circuit is completed and being open when said electrical circuit is open, whereby said temperature of said water jacket means is controlled to a substantially constant value during operation of said internal combustion engine.

5. The carburetor system of claim 4 wherein an indicator light is connected to an electrical line between said thermostat and said coolant solenoid valve, whereby said light is activated when said coolant solenoid valve is closed.

6. The carburetor system of claim 5 wherein said air intake means comprises an air intake line for introduction of external air to a filter and for further delivery of such filtered air to said saturation chamber means, said air intake line within said saturation chamber means having an inverted funnel connected thereto with a mouth of said funnel being positioned below said minimum level of said liquid fuel in said saturation chamber means and having a screen mesh for breaking up airflow as said air passes into said liquid fuel in said saturation chamber means.

7. The carburetor system of claim 6 wherein said vapor conveying means comprises a vapor line connected to said storage chamber means and said internal combustion engine, said vapor conveying means having an auxiliary external butterfly valve in an auxiliary air line connected to an auxiliary air filter, said auxiliary butterfly valve permitting downstream introduction of fresh outside air to enable formation of a mixture of air and fuel to a predetermined degree of leanness, whereby engine efficiency is improved, fuel economy can be effected, and evolution of harmful by-products of combustion can be reduced.

8. The carburetor system of claim 7 wherein a flow of said vapor mixture into said internal combustion engine can be regulated by throttle valve means, and said auxiliary butterfly valve is connected to said throttle valve means by a mechanical linkage, whereby said auxiliary butterfly valve opens as said throttle valve means opens.

9. The carburetor system of claim 8 wherein said internal combustion engine is connected to a primary float bowl having a bypass line connecting said primary float bowl to a fuel line solenoid valve in said fuel line, said fuel line solenoid valve being operable by a manual switch connected to a battery, whereby fuel from said fuel line passes into said bypass line when said manual switch is open, and fuel from said fuel line is diverted by said solenoid valve into said secondary float bowl when said manual switch is closed and an electrical circuit completed to said fuel line solenoid valve.

10. The carburetor system of claim 9 wherein said air intake means includes a control valve for selectably drawing either fresh air or heated air from an exhaust manifold shroud attached to said engine.

11. The carburetor system of claim 10 wherein a secondary air line is connected to said saturation chamber means above a liquid fuel level therein, said secondary air line having a secondary filter attached thereto and a manually operated butterfly valve therein for manually closing of adjusting a flow of air thereinto.

12. The carburetor system of 2 wherein said heat exchange means includes a coil immersed directly in said liquid fuel in said saturation chamber means.

* * * * *